Patented Sept. 8, 1953

2,651,627

UNITED STATES PATENT OFFICE 2,651,627

PROCESS FOR POLYMERIZING PHENYL-TRIFLUOROETHYLENE

Maurice Prober, Schenectady, N. Y., assignor to General Electric Company, a corporation of New York No Drawing. Application February 8, 1950, Serial No. 143,152

1 Claim. (Cl. 260—91.5)

This invention relates to the production of new materials and more particularly to monomers such as 1-phenyl-1,2-difluoroethylene and phenyltrifluoroethylene and polymers therefrom. These new materials have valuable and useful properties that make them especially suitable for use, for example, in molding, laminating, casting, coating and adhesive applications and for other purposes. For brevity, the monomeric compounds, 1-phenyl-1,2-difluoroethylene ($C_6H_5CF{=}CHF$)

and phenyltrifluoroethylene ($C_6H_5CF{=}CF_2$) will hereinafter be referred to as the "fluorinated styrenes."

Various methods may be employed to prepare the fluorinated styrenes with which the present invention is concerned. One method which I have found to be satisfactory for preparing the phenyltrifluoroethylene comprises reacting benzene with chlorotrifluoroethylene ($CFCl{=}CF_2$). This reaction is preferably conducted at an elevated temperature of the order of from about 350° to 700° C. in the vapor phase. Distillation of the reaction product may thereafter be employed to obtain the phenyltrifluoroethylene.

Another method which I have found of value for preparing the phenyltrifluoroethylene comprises effecting chlorination of the compound $C_6H_5COCHF_2$ with $PCl_5$ to form the compound $C_6H_5CCl_2CHF_2$. Thereafter this latter compound is fluorinated with $SbF_3$ to yield $C_6H_5CClFCHF_2$ which can be dehydrohalogenated to give phenyltrifluoroethylene. The compound 1-phenyl-1,2-difluoroethylene may be prepared by methods illustrated below.

The fluorinated styrenes may be polymerized separately or mixed with other polymerizable materials and interpolymerized therewith. For instance, the phenyltrifluoroethylene can be interpolymerized with at least one other organic compound copolymerizable with the fluorinated styrene and containing a polymerizable —CH=C< grouping, more particularly, a $CH_2{=}C{<}$ grouping, for example, styrene, vinyl acetate, methyl methacrylate, ethyl acrylate, etc.

The homogeneous and heterogeneous polymers vary from viscous masses to rubbery and hard solid bodies depending, for example, upon the extent of polymerization and the particular polymerizable or other modifying agent, if any, which is incorporated therewith. Heat, light or heat and light may be used to effect polymerization although under such conditions the rate of polymerization is relatively slow. Therefore, to accelerate the polymerization, I prefer to use a catalyst accompanied by heat, light or heat and light. Examples of polymerization catalysts which may be used are ozone, ozonides, inorganic super-oxides such as barium peroxide, sodium peroxide, etc., aliphatic acyl peroxides, e. g., acetyl peroxide, lauroyl peroxide, stearoyl peroxide, etc., peroxides of the aromatic and the aliphatic aromatic acid series, e. g., benzoyl peroxide, acetyl benzoyl peroxide, etc., various per-compounds such as perborates, persulfates, perchlorates, etc.; ditertiary butyl peroxide, tertiary butyl hydroperoxide, etc.; $BF_3$, $BF_3$ etherate, etc.

Any suitable amount of catalyst may be used, but in general the catalyst concentration will be within the range of from about 0.1 to 4.0 per cent, by weight, of the whole. The rate of polymerization and the properties of the final product vary with the time, temperature, and, if a catalyst is used, also with the catalyst concentration. Polymerization of the individual fluorinated styrenes or of the polymerizable compositions containing these fluorinated styrenes may be effected at from room temperature (20° to 30° C.) to temperatures above 100° C., for example, 130° C., but ordinarily I use temperatures within the range of from 40° to 120° C. in causing polymerization.

The homopolymer of phenyltrifluoroethylene has a relatively high softening point of the order of around 180° C. as a result of bulk polymerization, and a softening point of around 240° C. as a result of emulsion polymerization. In addition, it has considerably reduced flammability over non-fluorinated polystyrene.

In preparing copolymers of phenyltrifluoroethylene with other copolymerizable materials, the amount of the former may be varied within wide limits, good results being obtained when the phenyltrifluoroethylene is present in an amount equal to from about 1 to 99 per cent, by weight, of the total weight of the phenyltrifluoroethylene and the other copolymerizable material or materials. For many purposes I prefer that the phenyltrifluoroethylene comprises from about 10 to 90 per cent of the total weight of the copolymerizable ingredients. It is, of course, understood that I do not intend to be limited to the amount of phenyltrifluoroethylene which may be employed in preparing copolymers therefrom. The use of the fluorinated styrene in copolymers with other copolymerizable monomers gives products having much higher softening points than homopolymers prepared from the copolymerizable monomer itself.

In order that those skilled in the art may better understand how the present invention can be practiced, the following examples are given by way of illustration and not by way of limitation. All parts are by weight.

*Example 1*

A mixture of 56 parts benzene and 69 parts chlorotrifluoroethylene was passed through a heated tube maintained at a temperature of from 572–602° C. over a two-hour period. The reaction product was condensed in a water-cooled condenser and in a Dry Ice trap. The Dry Ice trap condensate was allowed to evaporate at room temperature leaving a small residue which was combined with the larger fraction (about 78.3 parts) of reaction product condensed in the water-cooled condenser. The reaction product was then diluted with ether to reduce mechanical losses, washed with dilute KOH and water, and dried over $CaCl_2$. The drying agent was removed and the remaining reaction product fractionally distilled at atmospheric pressure to yield the compound phenyltrifluoroethylene ($C_6H_5CF=CF_2$) having a boiling point of 133–136° C. at atmospheric pressure. Analysis of this monomeric material showed that it contained 61.2 per cent carbon and 3.4 per cent hydrogen (theoretical, carbon: 60.77 per cent, hydrogen: 3.19 per cent).

The reaction described in Example 1 may be accelerated by the use of various acidic substances, such as, for example, $BF_3$, etc.; substances with high specific surfaces, such as activated carbon, etc.; substances which form free radicals, for instance, lead tetramethyl, etc.; metals and alloys, e. g., copper, etc.; bases, such as ammonia, etc.

When a small percentage (3.0 per cent, by weight) of benzoyl peroxide was mixed with the phenyltrifluoroethylene and sealed under a vacuum in a glass tube and heated at 70–75° C. for 72 hours, there was obtained a polymer which when precipitated from benzene, washed thoroughly with methanol, and dried in a vacuum oven, yielded a homopolymer having a softening range under light load of about 181–187° C.

*Example 2*

This example illustrates another method for preparing phenyltrifluoroethylene. More particularly, 73 parts $C_6H_5COCHF_2$ [(described in the article by Simons et al., Journal American Chemical Society, 65, 2064 (1943)] and 114.7 parts $PCl_5$ were refluxed together for 3 hours. The reaction mixture was diluted with about 75 parts $CHCl_3$, and the phosphorous halide removed by thorough washing with water. The solution was dried and the solvent removed by fractional distillation. The residue was fractionally distilled at 29.8–30.3 mm. to yield 83.3 parts $C_6H_5CCl_2CHF_2$, B. P. 107.0–109.4° C., $n_D^{20}$ 1.5086. Analysis of this compound ($C_6H_5CCl_2CHF_2$) showed it to contain 45.3 per cent carbon, 3.0 per cent hydrogen, 33.0 per cent chlorine and a molecular weight of about 210 (theoretical values are 45.53 per cent carbon, 2.87 per cent hydrogen, 33.6 per cent chlorine, molecular weight 211.0).

About 89.7 parts $C_6H_5CCl_2CHF_2$ prepared above and 25.5 parts $SbF_3$ were heated in a distilling flask immersed in an oil bath and the distillate collected between 168–180° C., most of it distilling over between 175–180° C. The residue was refluxed with about 50 parts of Freon 113 and this was added to the distillate. The mixture was washed with concentrated HCl, water, and dried. The solution was fractionally distilled to yield 36.9 parts $C_6H_5CClFCHF_2$, B. P. 94.7–97.0° C. at 60 mm. Analysis of the latter compound which had a refractive index of $n_D^{20}$ 1.4686 showed it to contain 49.8 per cent carbon, 3.3 per cent hydrogen, 18.45 chlorine, and had a molecular weight of about 194.5 (theoretical values being carbon 49.38 per cent, hydrogen 3.11 per cent, chlorine 18.22 per cent, and molecular weight 194.6).

To prepare the phenyltrifluoroethylene from the compound $C_6H_5CClFCHF_2$, 100 parts KOH were placed in a three-necked flask equipped with a dropping funnel, mercury-sealed stirrer, and an air cooled condenser with a partial take-off outlet. The flask was placed in an oil bath and the bath heated at 240–260° C. while 41 parts $C_6H_5CClFCHF_2$ were added over a 36 minute interval to the stirred KOH. The distillate was diluted with Freon 113 to reduce mechanical losses, and the organic solution dried. A small amount of t-butyl catechol was added to the still pot and the reaction mixture fractionally distilled. After several repeated distillations (to get a pure product) there was obtained a fraction boiling at about 134.5–136.8° C. (atmospheric pressure) which was identified as pure phenyltrifluoroethylene by analyses for carbon and hydrogen (carbon 60.3 per cent and hydrogen 3.5 per cent).

*Example 3*

The phenyltrifluoroethylene prepared in Example 2 was mixed with 2.9 per cent, by weight, benzoyl peroxide and sealed in a glass tube and heated for 72 hours at 70–75° C. The formed polymer was precipitated from benzotrifluoride, washed thoroughly with ethyl alcohol and dried in a vacuum oven. The softening range of this polymer under light load was about 185–195° C. Under comparable conditions polystyrene softened at 103–107° C. Carbon and hydrogen analyses on the polymer $[(C_6H_5CF=CF_2)_x]$ showed it to contain 60.8 per cent carbon and 3.2 per cent hydrogen which established conclusively the molecular structure of the polymer.

*Example 4*

The compound $C_6H_5CF=CHF$ was prepared by heating 38.9 parts $C_6H_5CClFCHF_2$, 52.2 parts zinc dust and 186 parts dioxane under reflux conditions for 27 hours. Addition of water to the reaction mixture and steam distillation thereof yielded an organic layer which, when washed with water several times and dried over calcium chloride, and followed by removal of the drying agent and subsequent rectification of the solution, gave the desired compound boiling between 86.2 and 90.2° C. at 60 mm. and having a refractive index of $n_D^{20}$ 1.5061. Analysis of the compound showed it to contain 68.7 per cent carbon and 4.5 per cent hydrogen (theoretical 68.57 per cent carbon and 4.32 per cent hydrogen).

The two monomeric materials described above may be considered as falling within the generic formula $C_6H_5CF=CFX$ where X is a member selected from the class consisting of hydrogen and chlorine. Although both the $C_6H_5CF=CF_2$ and $C_6H_5CF=CFH$ polymerize, nevertheless, I have found that the former, under comparable conditions of polymerization and using benzoyl peroxide as a catalyst, will give more than a five-fold greater yield of polymer than is possible when using the latter as the polymerizable monomer.

The claimed monomers may be used to impregnate and coat various fillers or sheet materials and thereafter be polymerized in situ by suitable means preferably using heat and a catalyst under varying conditions of temperature and pressure. If desired, the monomer may be polymerized beforehand, dissolved in a suitable solvent, and the various fillers and sheet materials thereafter treated with the solution and the solvent removed by suitable means.

Fillers treated in accordance with the methods described above may be used in various molding applications, or sheet materials impregnated with the monomers may be superposed upon each other and molded under heat and pressure to yield laminated panels having utility in applications requiring good heat stability and electrical properties.

What I claim as new and desire to secure by Letters Patent of the United States is:

The method which comprises heating phenyltrifluoroethylene with a small amount of benzoyl peroxide for about 72 hours at a temperature of from about 70 to 75° C., precipitating the formed polymer and washing it with ethyl alcohol to obtain polyphenyltrifluoroethylene having a softening point of about 185° to 195° C.

MAURICE PROBER.

References Cited in the file of this patent

UNITED STATES PATENTS

| Number | Name | Date |
|---|---|---|
| 2,378,453 | Weinmayr | June 19, 1945 |
| 2,398,483 | Weinmayr | Apr. 16, 1946 |
| 2,426,172 | Benning | Aug. 26, 1947 |
| 2,612,528 | Cohen | Sept. 30, 1952 |

OTHER REFERENCES

Whitmore: "Organic Chemistry," pages 704, 705, Van Nostrand (1937).